United States Patent [19]

Proctor et al.

[11] Patent Number: 5,847,749

[45] Date of Patent: *Dec. 8, 1998

[54] VIDEO REPORTING SYSTEM FOR ENABLING REAL-TIME, UNIDIRECTIONAL DATA TRANSMISSION FROM MOBILE SOURCES

[75] Inventors: Richard John Proctor; Michael Denis Batts, both of Dorst, United Kingdom

[73] Assignee: GPT Limited, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 373,370

[22] Filed: Jan. 17, 1995

[30] Foreign Application Priority Data

Jan. 17, 1994 [GB] United Kingdom .................. 9400813

[51] Int. Cl.⁶ ...................................... H04N 7/10
[52] U.S. Cl. ................... 348/6; 348/17; 455/6.1
[58] Field of Search ................. 348/12, 13, 14, 348/15, 16, 6, 7, 10, 17, 18, 19, 552; 455/3.1, 5.1, 6.3, 6.1; 379/90.01; H04N 4/10, 7/14, 7/12

[56] References Cited

U.S. PATENT DOCUMENTS

| | | |
|---|---|---|
| 4,608,686 | 8/1986 | Barsellotti . |
| 4,789,981 | 12/1988 | Yanosy, Jr. et al. . |
| 4,980,911 | 12/1990 | Sues et al. . |
| 5,461,616 | 10/1995 | Suzuki ................................ 348/14 X |

FOREIGN PATENT DOCUMENTS

| | | |
|---|---|---|
| 0 146 894 A2 | 7/1985 | European Pat. Off. . |
| 2 142 803 | 1/1985 | United Kingdom . |
| WO 89/08364 | 9/1989 | WIPO . |

*Primary Examiner*—Nathan Flynn
*Attorney, Agent, or Firm*—Kirschstein, et al.

[57] ABSTRACT

Video on Demand allows, for example, a coded TV signal or film to be transmitted to a subscriber over a standard two-wire metallic telephone line. A similar apparatus for connecting unidirectional mobile data output to a destination via a standard metallic telephone line, the apparatus comprising a High Bandwidth Subscriber Link Transmitter Unit connected between the data source and a connection point on the telephone line and a High Bandwidth Subscriber Link Receiver Unit connected to a further connection point on the telephone line would enable a signal such as from a video camera to be input at or subscriber terminal and transmitted over a metallic telephone line.

9 Claims, 2 Drawing Sheets

VIDEO REPORTING SYSTEM FOR ENABLING REAL-TIME, UNIDIRECTIONAL DATA TRANSMISSION FROM MOBILE SOURCES

BACKGROUND OF THE INVENTION

Currently a system known as Video on Demand is being developed which in one embodiment allows an International Standards Organisation (ISO) Moving Picture Expert Group (MPEG) coded TV signal or film to be transmitted to a subscriber on a standard two-wire metallic, for example copper, telephone line. MPEG reduces 30 Mb/s of normal television signals or 200 Mb/s of High Density Television (HDTV) to any lower rate. Typically for Video on Demand the bandwidth is reduced by the MPEG coding to 2 Mb/s from the 5–6 Mb/s bandwidth of normal television signals. It is possible to transmit the 2 Mb/s signal over such a telephone line together with a typically 9.6 kb/s or 19.2 kb/s signalling control channel and telephony and possible increases on the bandwidth which may be transmitted are under development.

Such a system may typically include a head-end Asymmetric Digital Subscriber Link (ADSL) card at the exchange which transmits the MPEG coded signal to a subscriber via the telephone line. At the subscribers end of the line a customer ADSL card connects the signal to a MPEG video-decoder which decodes the signal to a standard video signal to be input to a domestic television set.

Such a system enables a subscriber to select video-recorded films from a library and have them transmitted via a telephone link and displayed on the subscriber's television set.

A television company when reporting a news item may frequently be in a situation where the event being reported is not conveniently located for the use of a fixed link. The alternatives currently available are creating a video recording or using a microwave or satellite link. The first alternative suffers from the delay incurred in delivering the recording to a suitable point for transmission and is hence not "live" for the viewer and the second and third alternatives while providing a "live" input require the provision of a relatively large and expensively equipped vehicle for the microwave or satellite transmission equipment.

The object of the present Invention Is to provide a further alternative means of making a "live" link using the ADSL technique and a normal telephone line.

While the present invention is described with reference to a video camera as the data source, the technique is applicable to other situations where a unidirectional data transfer is needed.

SUMMARY OF THE INVENTION

According to the present invention there is provided apparatus for connecting a unidirectional mobile data source to a destination via a standard metallic telephone line, the apparatus comprising a High Bandwidth Subscriber Link Transmitter Unit connected between the data source and a connection point on the telephone line and a High Bandwidth Subscriber Link Receiver Unit connected to a further connection point on the telephone line.

There Is further provided a method of connecting a unidirectional mobile data source to a destination via a standard metallic telephone line comprising transmitting the signal along the line from a High Bandwidth Subscriber Link Transmitter Unit to a High Bandwidth Subscriber Link Receiver Unit.

The data source may be a video camera and the apparatus may include a video coder (codec).

The connection point may be a subscriber connection point and the further connection point an exchange Test Access Highway.

BRIEF DESCRIPTION OF THE DRAWINGS

The present invention will now be described, by way of example, with reference to the accompanying drawings in which.

DETAILED DESCRIPTION OF A PREFERRED EMBODIMENT

A known ADSL system combines analogue telephony, with a high speed one way data channel and a low speed bi-directional control channel, over the existing twisted copper pair between local exchange and subscriber. The high speed data channel, from local exchange to subscriber, is capable of carrying compressed digital video data or high quality computer graphics.

Figure 1:
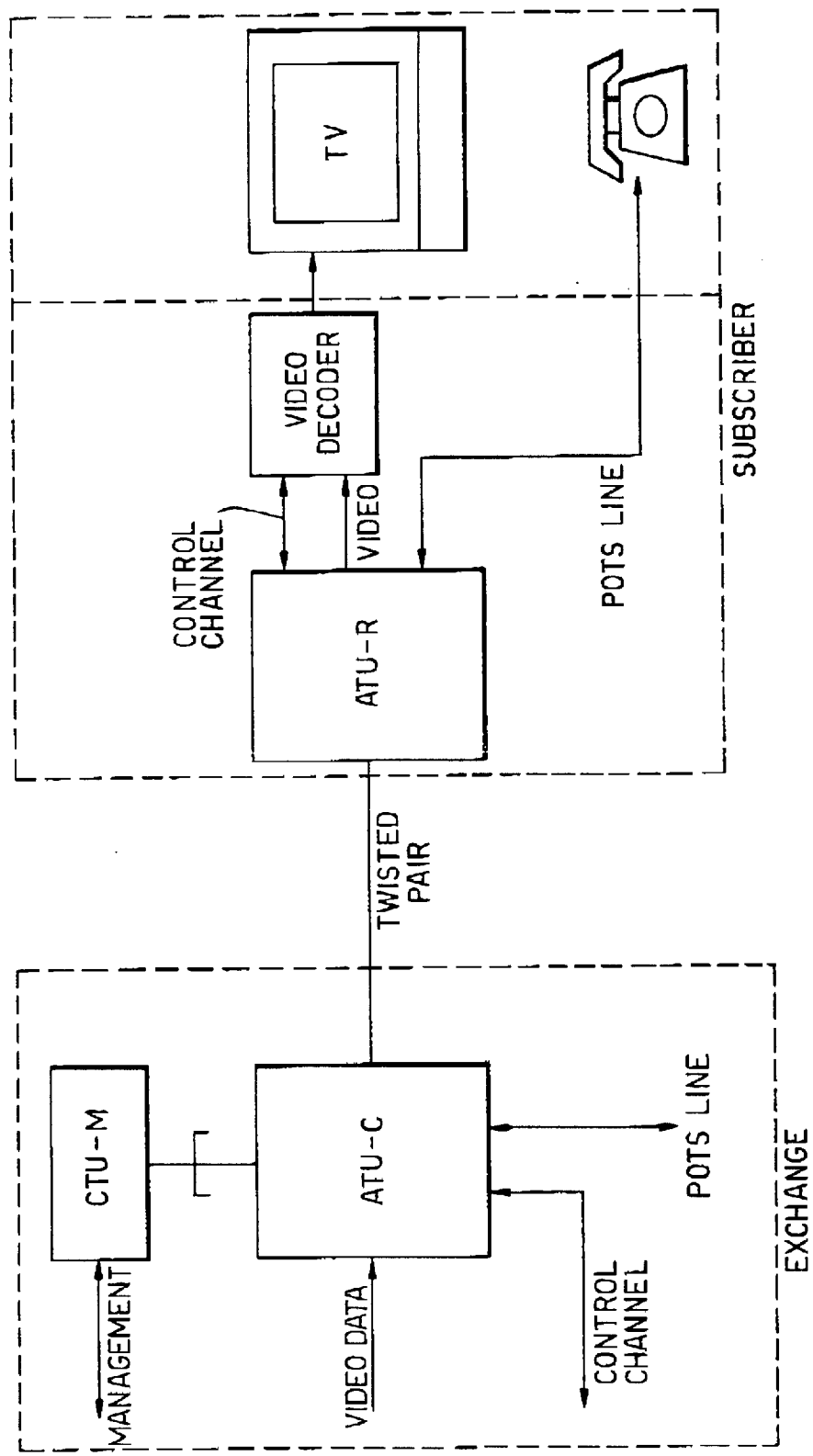
FIG. 1 shows a diagrammatic representation of a prior art ADSL system.

The system, which is shown in FIG. 1, comprises an Exchange Terminal Unit (or ATU-C), a Maintenance Unit (or CTU-M) and a Remote Terminal Unit (or ATU-R). The ATU-Cs and CTU-Ms are housed in an Exchange Mounting Shelf and the ATU-Rs are housed in a Single Slot Mounting within the subscribers premises. There is one ATU-C and one ATU-R subscriber.

The system uses the Carrierless Amplitude Modulated, Phase Modulated (CAP) line code to provide reliable transport over existing metallic, for example copper, facilities. The high speed data channel operates at the E1 rate, and the bi-directional control channel is a 9.6 or 19.2 kb/s asynchronous RS232 channel.

The ATU-C accepts a standard 2.048 Mb/s G703 (E1) signal (Video Data) for transport downstream to the subscriber, a standard analogue telephony signal (POTS) and an RS232 control channel signal Forward Error Correction (FEC) is used on the high speed channel. The asynchronous low speed control channel is carried as a 16 kb/s synchronous signal.

The ATU-R separates the high speed downstream video data channel from the control and telephony channels, and provides the interfaces to the subscriber. The high speed channel is delivered at the 2.048 Mb/s (E1) rate, and the control channel at 9.6 or 19.2 kb/s.

The Exchange Maintenance Unit (CTU-M) monitors and controls up to 20 ATU-Cs. It provides serial communications to local and remote terminals and OS interfaces, in addition to providing relay contacts for a local alarm scheme, if required.

The ADSL cards form one specific version of what may be more broadly called High Bandwidth Subscriber Link Units.

Figure 2:
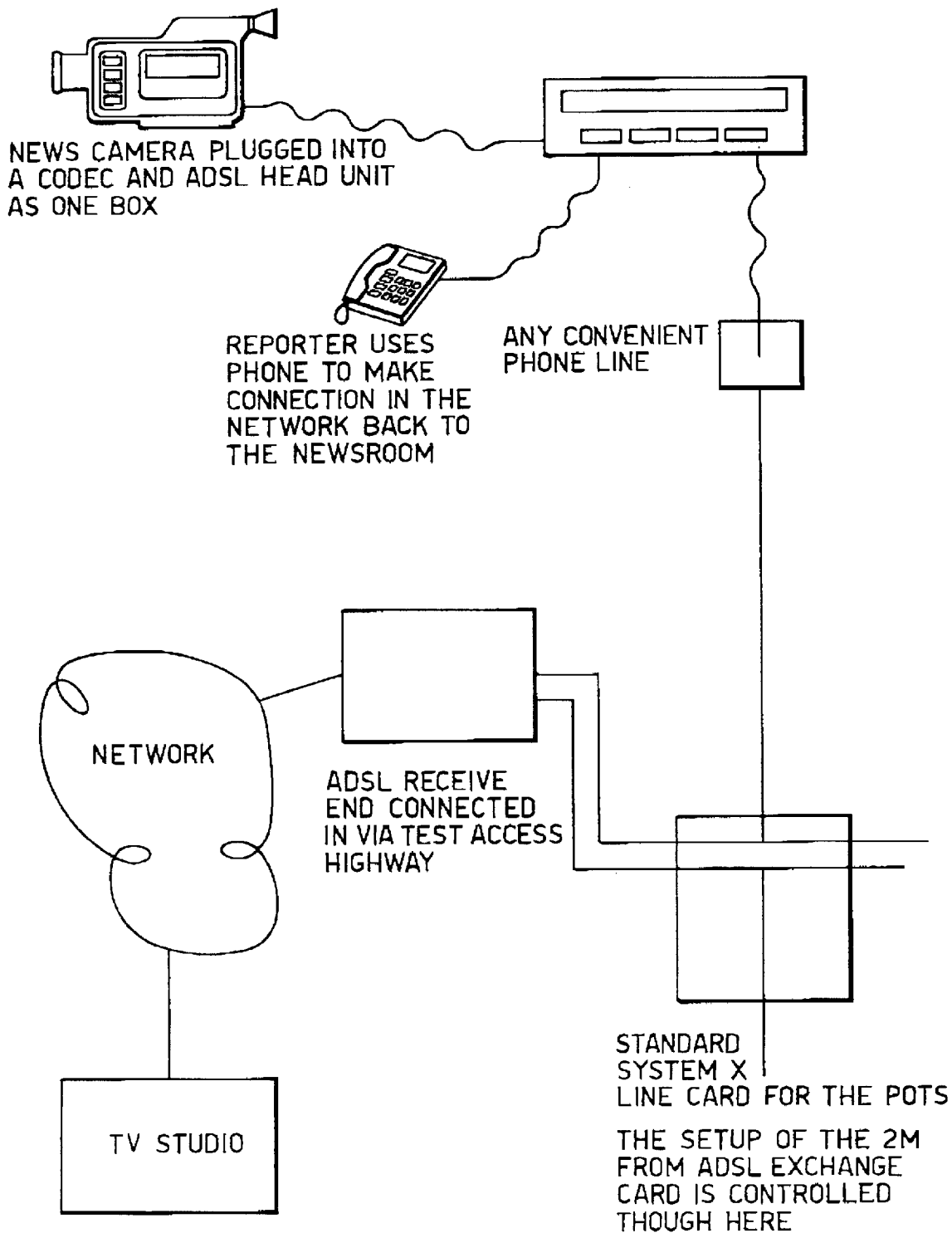
FIG. 2 shows a diagrammatic representation of one embodiment of the present invention.

Referring now to FIG. 2, a video camera will be plugged into a unit containing a codec and an ADSL exchange card, the output from this unit typically having a mating connector for a standard subscriber telephone termination.

The unit will also have a socket for a connection to be made from a telephone having tone-dialling to enable the camera operator to transmit control signals, or a telephone having loop-disconnect dialling may be used.

At the local exchange an ADSL receiver card will be connected, typically using the exchange Test Access Highway.

The Test Access Highway occurs at exchanges and concentrators and the provision of one ADSL receiver card in each exchange and concentrator across the United Kingdom would allow a news item from a video camera to a input from approximately 85% of the homes. The remaining 15% are too far from exchanges or concentrators for the ADSL to work or have inappropriate connections to the exchange.

The Test Access Highway is a metallic 4-wire shared connection at an exchange or concentrator that allows test equipment access to the line and the line card to test them both. This highway will typically have a number of pieces of dedicated test equipment and also have scope for external engineering connections for other specialised test equipment. An ADSL receiver card could be connected via an engineering connection or via a dedicated port if this was provided.

The ADSL receiver card will be connected via a network using a standard 2 Mb/s link to a TV studio for transmission. Alternatively, Asynchronous Transfer Mode (ATM) or Synchronous Digital Hierarchy (SDH) or some other Communication Link may be used.

A typical set-up procedure would be as follows:

A news camera operator would (i) plug his video camera into the codec on a codec/ASDL Unit, plug a telephone into the unit (assuming one is not an Integral part of the unit) and plug the unit into a telephone line.

(ii) Call the exchange using the telephone and cause the test access connection to be made to give access to the exchange ADSL card. The telephone will still be connected as it will loop through the exchange ADSL card and back into the customer line card. This could be made to happen automatically or be via an engineering set-up request.

(iii) A high-bandwidth connection is made from the exchange ADSL card to the TV is station. Again this could be automatic or via engineer/management actions.

The camera operator then will have typically a 2 Mb/s link to the TV studio.

The connection described could be used to provide a service in the forward direction to send data from the network/exchange to a subscriber using the test highway and an ADSL transmitter card at the exchange and an ADSL receiver card at the subscriber connection.

Such an arrangement could for instance be used to test whether a subscriber connection is suitable for ADSL.

What we claim is:

1. A video reporting system for enabling a real-time, unidirectional, data transmission of high-bandwidth video data signals over a metallic telephone line to an intermediate destination before or at the input to a telephone exchange connected thereto, said signals being from a mobile video data source that is movable to said intermediate destination, said system comprising:
   a) a high-bandwidth subscriber link transmitter unit connected between the mobile source and a first telephone subscriber connection point on the telephone line;
   b) a high-bandwidth subscriber link receiver unit connected at said intermediate destination; and
   c) means at the first connection point, for accessing the receiver unit to establish a high-bandwidth connection for the data signals between said intermediate destination and a further destination.

2. A method of enabling a real-time, unidirectional, data transmission of high-bandwidth video data signals over a metallic telephone line to an intermediate destination before or at the input to a telephone exchange connected thereto, said signals being from a mobile video data source that is movable relative to the destination, said method comprising the steps of:
   a) connecting a high-bandwidth subscriber link transmitter unit between the mobile source and a first telephone subscriber connection point on the telephone line;
   b) connecting a high-bandwidth subscriber link receiver unit connected at said intermediate destination; and
   c) accessing at the first connection point, the receiver unit to establish a high-bandwidth connection of the data signals between said intermediate destination and a further destination.

3. The video reporting system of claim 1, wherein the transmitter unit and the receiver unit include an asymmetric digital subscriber link card.

4. The video reporting system of claim 3, wherein the transmitter unit includes a coder-decoder.

5. The video reporting system of claim 4, wherein the transmitter unit includes a housing in which the link card and the coder-decoder are mounted; wherein the housing has a telephone connector; and wherein the accessing means includes a telephone having a telephone wire for plugging into the telephone connector.

6. The video reporting system of claim 5, wherein the housing has an input port connected to the coder-decoder, and wherein the data source is a field-portable video camera having a wire for plugging into said input port.

7. The video reporting system of claim 1, and further comprising a test line connected to said exchange; and wherein the receiver unit is connected on the test line.

8. The video reporting system of claim 1, and further comprising a telephone concentrator on the telephone line, and a test line connected to said concentrator; and wherein the receiver unit is connected on the test line.

9. The video reporting system of claim 1, wherein the high-bandwidth connection extends over a telephone network having a data transmission rate on the order of two megabits per second.

* * * * *